United States Patent [19]

Presby

[11] 4,403,826
[45] Sep. 13, 1983

[54] ULTRAVIOLET RADIATION DETECTOR

[75] Inventor: Herman M. Presby, Highland Park, N.J.

[73] Assignee: Bell Telephone Laboratories, Incorporated, Murray Hill, N.J.

[21] Appl. No.: 246,699

[22] Filed: Mar. 23, 1981

[51] Int. Cl.³ .......................... G02B 5/14; G01J 1/42
[52] U.S. Cl. ................... 350/96.30; 250/372; 350/1.1; 350/96.34
[58] Field of Search ............ 350/1.1, 96.29, 96.30, 350/96.31, 96.32, 96.34, 96.10; 250/372, 373

[56] References Cited

U.S. PATENT DOCUMENTS

| | | | |
|---|---|---|---|
| 3,546,460 | 12/1970 | Lally | 350/1.1 X |
| 3,935,119 | 1/1976 | Barber et al. | 350/96.34 X |
| 4,061,922 | 12/1977 | Last | 250/372 X |
| 4,161,656 | 7/1979 | Marcuse et al. | 250/459.1 |
| 4,243,299 | 1/1981 | Gliemeroth et al. | 350/96.34 |
| 4,257,676 | 3/1981 | Greubel et al. | 350/96.34 |

OTHER PUBLICATIONS

Proceedings of the IEEE, vol. 68(10) Oct. 1980, pp. 1236–1240, "Fiber Transmission Losses in High-Radiation Fields," by George H. Sigel, Jr.

*Primary Examiner*—John D. Lee
*Attorney, Agent, or Firm*—S. Sherman

[57] ABSTRACT

Small, highly sensitive uv detectors are fabricated utilizing the fluorescence induced in the core of an optical fiber when illuminated by uv radiation. The fluorescence light is then guided by the fiber itself, by a similar fiber or by a different optical fiber to a remote location and detected by a standard v1 detector. To determine the intensity of the uv, the sensor is calibrated at the wavelength of interest.

6 Claims, 5 Drawing Figures

4,403,826

ULTRAVIOLET RADIATION DETECTOR

TECHNICAL FIELD

This invention relates to ultraviolet radiation detectors.

BACKGROUND OF THE INVENTION

In U.S. Pat. No. 4,161,656 it is noted that the index-modifying dopants, used to grade the index profile of an optical fiber, fluoresce when exposed to ultraviolet radiation. This phenomenon is then employed as a means for measuring the index profile of fibers and fiber preforms.

There are numerous areas of activity that employ uv radiation in which the intensity and distribution of the uv light are important parameters. These include, for example, industrial monitoring of materials and processes, spectrofluorescent studies of materials, photoresist illumination, solar simulation, semiconductor annealing, computer PROM erasing, and germicidal sterilization.

Some of these processes are conducted in hostile environments and at wavelengths for which there are no satisfactory detectors. In many of these applications, the area of exposure is very small, making it very difficult, if not impossible, to measure the distribution of the uv light over the area. What is required for such measurements is a sensitive, yet extremely small uv sensor.

SUMMARY OF THE INVENTION

A uv detector, in accordance with the present invention comprises a uv sensor, a visible light (vl) detector, and an optical fiber for coupling between the uv sensor and the vl detector. The sensor comprises a filamentary host member in which there is embedded a dopant that fluoresces at the uv wavelength of interest.

DETAILED DESCRIPTION

Figure 1:
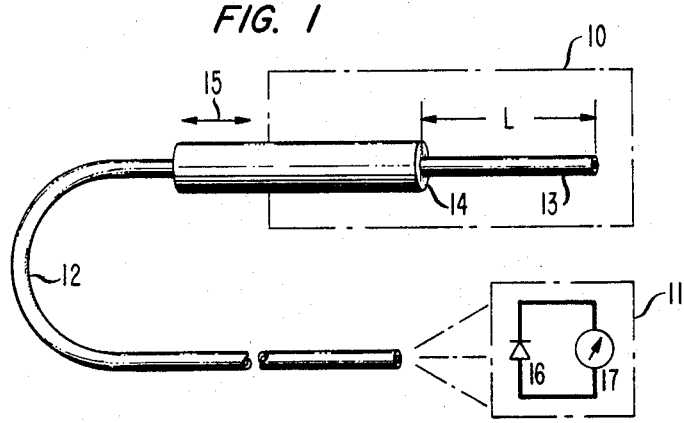
FIG. 1 shows an ultraviolet radiation detector in accordance with the invention.

Referring to the drawings, FIG. 1 shows a uv detecting system in accordance with the present invention comprising a uv sensor 10, a visible light (vl) detector 11, and a length of optical fiber 12 for coupling between the sensor and detector.

Figure 2:
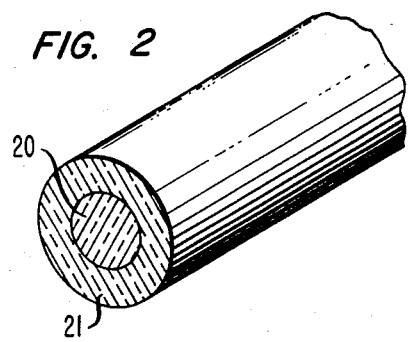
FIG. 2 shows the structural details of the uv sensor.

Sensor 10 comprises a filamentary member 13 of length L. Member 13 is made of a material that fluoresces upon exposure to ultraviolet radiation (i.e., between 1500 Å and 3250 Å) at the wavelength of interest. Advanageously, member 13 is a length of optical fiber comprising a fluid or solid core region 20 surrounded by a cladding 21 of lower refractive index, as illustrated in FIG. 2. In a solid core fiber, the core region is formed by the addition of a suitable index-modifying dopant, such as germanium, to a host material, such as silica. For purposes of the present invention, a variety of sensors can be fabricated using a variety of different dopants and fluids to cover the uv wavelength range of interest. For example, germanium has an absorption peak at about 250 nm, whereas phosphorous has an absorption peak at about 215 nm. In addition, sensors having different diameter cores are advantageously provided to permit measurements of varying fineness. For example, a typical signal mode fiber has a core diameter of $10\mu$, whereas a multimode fiber core is of the order of $50\mu$.

The concentration of the index-modifying dopant is advantageously high so as to provide the greatest possible fluorescent emission. As is known, the induced fluorescence varies as a linear function of the incident uv. Accordingly, the greater the dopant concentration, the greater the intensity of the resulting visible light.

If all that is required is an indication of the presence or absence of uv, no calibration of the sensor is required. If, however, quatitative measures are required, the sensor is calibrated for different exposure lengths at the wavelength of interest. The effective length is determined by means of an adjustable opaque sleeve 14 which can be moved longitudinally along member 13 as indicated by the double-headed arrow 15, to expose varying amounts of the member.

The fluorescence induced in member 13 is coupled to detector 11 by means of a length of conventional optical fiber 12. Advantageously, the sensor 13 can be a portion of the connecting fiber 12. The detector itself can be any well-known device responsive to light in the visible range. For purposes of illustration, a photodiode 16 and meter 17 are shown.

The principal advantage of the above-described fiber sensor is its small size which makes it possible to make very fine measurements. For example, some uv sources have irregular radiation patterns which are obviously undesirable if one requires uniform illumination. Using a small sensor makes it possible to obtain an accurate measurement of the radiation pattern.

Another advantage resides in the insensitivity of silica fibers to ionizing radiation. (See, "Fiber Transmission Losses in High-Radiation Fields," by George H. Sigel, Jr., puslished in the October 1980 issue of *Proceedings of the IEEE*, pp. 1236–1240. Also, U.S. Pat. No. 4,243,299.) This makes it possible to use fiber sensors in environments that are hostile to other types of uv sensors.

Figure 3:
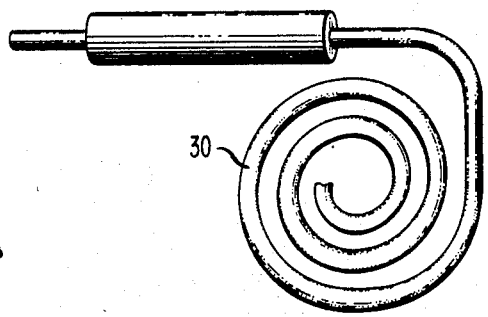
FIGS. 3, 4 and 5 show illustrative sensor configurations.

FIG. 3 shows a sensor configuration wherein the fiber 30 is wound into a spiral for increased sensitivity. Clearly, other sensor configurations can readily be devised to conform to unique situations. Because of its small cross-section, the overall size of the sensor can still be kept smaller than conventional uv sensors notwithstanding the length of the fiber employed.

Figure 4:
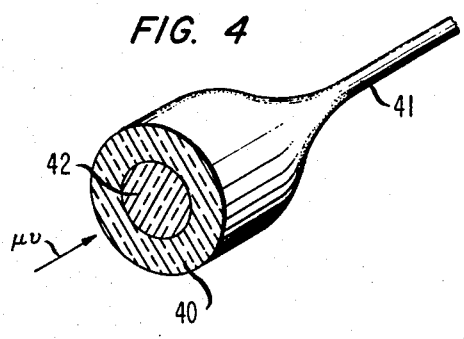

FIG. 4 shows a sensor 40 which tapers from a maximum diameter at the end exposed to the uv to a mininum diameter at the end coupled to the connecting fiber 41. For improved light gathering efficiency, a small lens (not shown) can be included to focus the uv radiation onto the core region 42 of the sensor.

In addition to shaping the sensor for most efficient operation, the choice of an absorbing material for maximum sensitivity is an equally important parameter. In order to increase the range of wavelengths that can be detected, the sensor is advantageously made of a length of liquid core fiber. More generally, the sensor is made of a length of hollow tubing into which an appropriate core material can be inserted.

Figure 5:
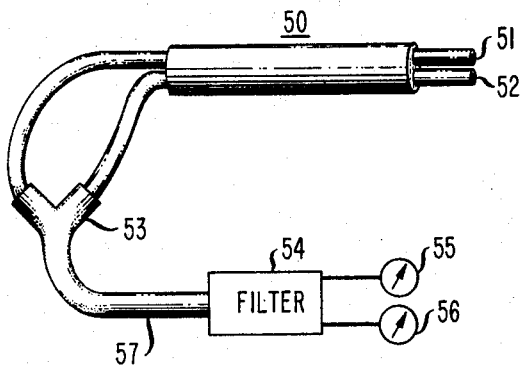

If the uv source includes more than one wavelength, multiple sensor elements, each containing a different uv sensitive material, can be packaged together, as illustrated in FIG. 5. In this embodiment, the sensor 50 includes two sensor elements 51 and 52. Element 51 can, for example, be a solid core fiber doped with $GeO_2$ and element 52 a $P_2O_5$ doped fiber. The induced fluorescence can either be coupled directly by separate means to separate detectors or, alternatively, can be combined by means of a coupler 53, as illustrated in FIG. 5, and led by means of a common fiber 57 to a wavelength filter 54 wherein the two different vl signals are separated. The two recovered signals are then measured by a pair of detectors 55 and 56.

What is claimed is:

1. An ultraviolet (uv) radiation detector comprising:
a uv sensor (10), including at least one length of optical fiber having a core region made of a material which fluoresces at the uv wavelength of interest;
a visible light (vl) detector (11);
and a length of optical fiber (12) for coupling said uv sensor to said vl detector.

2. The detector according to claim 1 wherein said core region is made of a solid material.

3. The detector according to claim 1 wherein said core region is made of a liquid material.

4. The detector according to claim 1 wherein said length of fiber forming said uv sensor is wound in a spiral.

5. The detector according to claim 1 wherein said length of fiber (40) forming said uv sensor tapers from a maximum diameter at its input end to a minimum diameter of its output end.

6. The detector according to claim 1 wherein said uv sensor (50) comprises a plurality of optical fiber lengths (51-52), each of which includes a core region which is sensitive to uv radiation at a different wavelength.

* * * * *